(12) United States Patent
Do et al.

(10) Patent No.: US 11,795,183 B2
(45) Date of Patent: Oct. 24, 2023

(54) TRANSITION METAL COMPOUND, CATALYST COMPOSITION INCLUDING THE SAME AND METHOD FOR PREPARING POLYMER USING SAME

(71) Applicant: LG Chem, Ltd., Seoul (KR)

(72) Inventors: Young Shil Do, Daejeon (KR); A Rim Kim, Daejeon (KR); Yun Jin Lee, Daejeon (KR); Ki Soo Lee, Daejeon (KR); Choong Hoon Lee, Daejeon (KR); Seung Hwan Jung, Daejeon (KR)

(73) Assignee: LG Chem, Ltd.

( * ) Notice: Subject to any disclaimer, the term of this patent is extended or adjusted under 35 U.S.C. 154(b) by 242 days.

(21) Appl. No.: 17/267,321

(22) PCT Filed: Dec. 10, 2019

(86) PCT No.: PCT/KR2019/017410
§ 371 (c)(1),
(2) Date: Feb. 9, 2021

(87) PCT Pub. No.: WO2020/122568
PCT Pub. Date: Jun. 18, 2020

(65) Prior Publication Data
US 2021/0340164 A1    Nov. 4, 2021

(30) Foreign Application Priority Data
Dec. 12, 2018 (KR) .................. 10-2018-0160220

(51) Int. Cl.
| | | |
|---|---|---|
| C07F 17/00 | (2006.01) | |
| C08F 4/76 | (2006.01) | |
| C08F 4/64 | (2006.01) | |
| C07F 7/28 | (2006.01) | |
| C08F 4/659 | (2006.01) | |
| C08F 4/6592 | (2006.01) | |
| C08F 110/02 | (2006.01) | |
| C08F 110/06 | (2006.01) | |
| C08F 210/16 | (2006.01) | |

(52) U.S. Cl.
CPC .............. *C07F 7/28* (2013.01); *C08F 4/6592* (2013.01); *C08F 4/65912* (2013.01); *C08F 110/02* (2013.01); *C08F 110/06* (2013.01); *C08F 210/16* (2013.01); *C07F 17/00* (2013.01); *C08F 4/64* (2013.01); *C08F 4/76* (2013.01)

(58) Field of Classification Search
CPC .... C07F 7/00; C07F 7/28; C07F 17/00; C08F 4/64; C08F 4/76
See application file for complete search history.

(56) References Cited

U.S. PATENT DOCUMENTS

| | | | |
|---|---|---|---|
| 5,064,802 A | 11/1991 | Stevens et al. | |
| 6,015,916 A | 1/2000 | Sullivan et al. | |
| 6,479,646 B1 | 11/2002 | Nakano et al. | |
| 6,548,686 B2 | 4/2003 | Nabika et al. | |
| 9,376,519 B2 * | 6/2016 | Cho ................... | C08F 4/65912 |
| 9,481,747 B2 * | 11/2016 | Park ................... | C08F 4/65904 |
| 9,550,848 B2 * | 1/2017 | Lee ........................ | C08F 4/76 |
| 9,683,061 B2 * | 6/2017 | Do ........................ | C08F 10/00 |
| 10,336,842 B2 * | 7/2019 | Cho ........................ | C07F 7/02 |
| 2013/0203949 A1 | 8/2013 | Lee et al. | |
| 2015/0011770 A1 | 1/2015 | Lee et al. | |
| 2015/0094435 A1 | 4/2015 | Cho et al. | |
| 2015/0361196 A1 | 12/2015 | Do et al. | |
| 2016/0046735 A1 | 2/2016 | Lee et al. | |
| 2016/0272743 A1 | 9/2016 | Park et al. | |
| 2017/0349674 A1 * | 12/2017 | Cho ....................... | C07F 17/00 |
| 2019/0106513 A1 | 4/2019 | Cho et al. | |

FOREIGN PATENT DOCUMENTS

| | | |
|---|---|---|
| CN | 102834402 A | 12/2012 |
| CN | 105229039 A | 1/2016 |
| EP | 1331230 B1 | 10/2010 |
| EP | 2559695 A2 | 2/2013 |
| EP | 2873671 A1 | 5/2015 |
| JP | 2002037795 A | 2/2002 |
| KR | 100986301 B1 | 10/2010 |
| KR | 20110114473 A | 10/2011 |
| KR | 2015-0034592 A | 4/2015 |
| KR | 20150034652 A | 4/2015 |
| KR | 20150034655 A | 4/2015 |
| KR | 101528102 B1 | 6/2015 |
| KR | 20160115700 A | 10/2016 |
| KR | 20170004397 A | 1/2017 |

(Continued)

OTHER PUBLICATIONS

Ryabov, A.N.; Gribkov, D.V.; Izmer, V.V.; Voskobynikov, A.Z. Organometallics 2002, 21, 2842-2855. (Year: 2002).*
Search report from International Application No. PCT/KR2019/017410, dated Mar. 24, 2020.
Gibson, Vernon C., et al. "Advances in Non-Metallocene Elefin Polymerization Catalysis." Chemical Reviews, 2003 (Published On Web Dec. 17, 2002), vol. 103, pp. 283-315.
Zhang, Yuetao, et al., "Constrained Geometry Tetramethylcyclopentadientyl-phenoxytitanium Dichlorides: Template Synthesis, Structures, and Catalyic Properties for Ethylene Polymerization." Organometallics, 2004 (Received Sep. 15, 2003; Published on Web Dec. 25, 2003), vol. 23, No. 3, pp. 540-546.

(Continued)

*Primary Examiner* — Rip A Lee
(74) *Attorney, Agent, or Firm* — Lerner David LLP

(57) ABSTRACT

A transition metal compound having a novel structure is disclosed herein. The transition metal compound can have improved structural stability by forming a stable coordination site of a transition metal through controlling a bond angle formed by the amido group of a phenylene bridge, a cyclopentadienyl ring, and a transition metal. The transition metal compound has excellent copolymerization properties and may produce an olefin polymer having a high molecular weight in a ultra low density region.

14 Claims, No Drawings

(56) References Cited

FOREIGN PATENT DOCUMENTS

| KR | 10-2017-0074678 A | * | 6/2017 | ................ C07F 7/00 |
|----|-------------------|---|--------|---------------------------|
| KR | 20170074675 A     |   | 6/2017 |                           |
| KR | 10-2018-0054060 A | * | 5/2018 | ............. C07F 19/00 |
| KR | 20180067939 A     |   | 6/2018 |                           |
| WO | WO 2004/067581 A1 | * | 8/2004 | ............. C08F 4/625 |
| WO | 2008084931 A1     |   | 7/2008 |                           |
| WO | WO 2015/046705 A1 | * | 2/2015 | ................ C07F 7/00 |
| WO | WO 2017/003261 A1 | * | 1/2017 | ................ C07F 7/28 |
| WO | WO 2017/003262 A1 | * | 5/2017 | ................ C07F 7/28 |
| WO | WO 2018/106029 A1 | * | 6/2018 | ............ C08F 4/6529 |

OTHER PUBLICATIONS

Turner, et. al, "Facile resolution of constrained geometry indenyl-phenoxide ligation." Chemical Communications, (Received Jan. 2, 2003; Accepted Mar. 6, 2003; Published on Web Mar. 28, 2003), pp. 1034-1035.

Christie, Steven D. R., et al., "Novel Routes to Bidentate Cyclopentadienyl-Alkoxide Complexes of Titanium: Synthesis of (n5-o-C5R1 4CHR2CH2CR3R4O)TiCl2." Organometallics, 1999 (Received Sep. 9, 1998; Publication on Web Jan. 7, 1999), vol. 18, No. 3, pp. 348-359.

Gielens, Esther E. C. G., et al., "Titanium Hydrocarbly Complexes with a Linked Cyclopentadienyl-Alkoxide Ancillary Ligand; Participation of the Ligand in an Unusual Activation of a (Trimethylsilyl)methyl Group." (Received Oct. 6, 1997; Publication on Web Apr. 8, 1998), vol. 17, No. 9, pp. 1652-1654.

Chen, You-Xian, et al., "A Novel Phenolate "Constrained Geometry" Catalyst System. Efficient Synthesis, Structural Characterization, and a-Olefin Polymerization Catalysis." Organometallics, 1997, (Received Aug. 18, 1997), vol. 16, No. 26, pp. 5958-5963.

Rau, et al., "Synthesis and application in high-pressure polymerization of a titanium complex with a linked cyclopentadienyl-phenoxide ligand." Journal of Organometallic Chemistry, 2000 (Received Feb. 25, 2000), vol. 608, pp. 71-75.

Extended European Search Report for Application No. 19896134.4 dated Dec. 8, 2021, pp. 1-5.

* cited by examiner

TRANSITION METAL COMPOUND, CATALYST COMPOSITION INCLUDING THE SAME AND METHOD FOR PREPARING POLYMER USING SAME

CROSS-REFERENCE TO RELATED APPLICATIONS

The present application is a national phase entry under 35 U.S.C. § 371 of International Application No. PCT/KR2019/017410, filed on Dec. 10, 2019, which claims priority from Korean Patent Application No. 10-2018-0160220, filed on Dec. 12, 2018, the entire contents of which are incorporated by reference herein.

TECHNICAL FIELD

The present invention relates to a transition metal compound, a catalyst composition including the same and a method for preparing a polymer using same.

BACKGROUND ART

[Me$_2$Si(Me$_4$C$_5$)NtBu]TiCl$_2$ (Constrained-Geometry Catalyst, hereinafter, will be abbreviated as CGC) was reported by Dow Co. in the early 1990s (U.S. Pat. Registration No. 5,064,802), and excellent aspects of the CGC in the copolymerization reaction of ethylene and alpha-olefin may be summarized in the following two points when compared to commonly known metallocene catalysts: (1) at a high polymerization temperature, high activity is shown and a polymer having high molecular weight is produced, and (2) the copolymerization degree of alpha-olefin having large steric hindrance such as 1-hexene and 1-octene is very excellent. In addition, as various properties of the CGC during performing a polymerization reaction are gradually known, efforts for synthesizing the derivatives and using thereof as a polymerization catalyst have been actively conducted in academy and industry.

As one approach, the synthesis of a metal compound introducing various bridges instead of a silicon bridge and a nitrogen substituent and the polymerization thereof has been conducted. Typical metal compounds known until now are illustrated as Compounds (1) to (4) below (Chem. Rev. 2003, 103, 283).

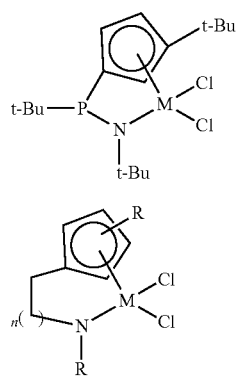

(1)

(2)

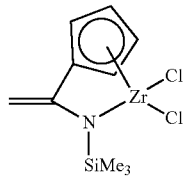

(3)

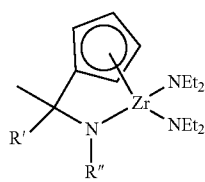

(4)

The above Compounds (1) to (4) introduce a phosphorous bridge (1), an ethylene or propylene bridge (2), a methylidene bridge (3) or a methylene bridge (4) instead of the silicon bridge of a CGC structure. However, improved results on activity, copolymerization performance, etc. could not be obtained by applying ethylene polymerization or copolymerization with alpha-olefin when compared to those obtained by applying the CGC.

In addition, as another approach, a lot of compounds composed of an oxido ligand instead of the amido ligand of the CGC have been synthesized, and an attempt on polymerization using thereof has been conducted to some extent. Examples thereof are summarized in the following.

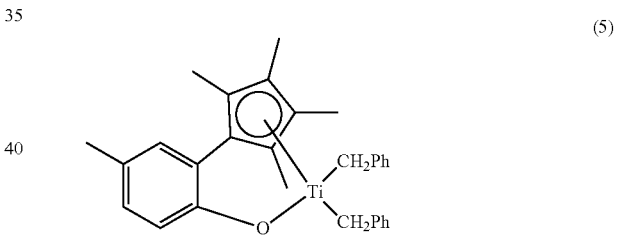

(5)

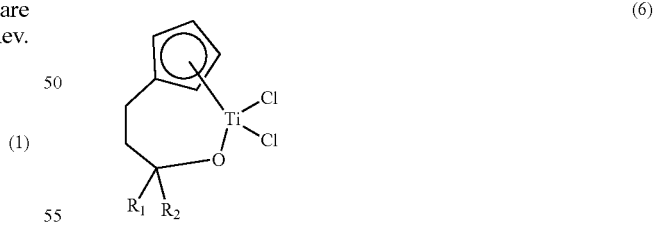

(6)

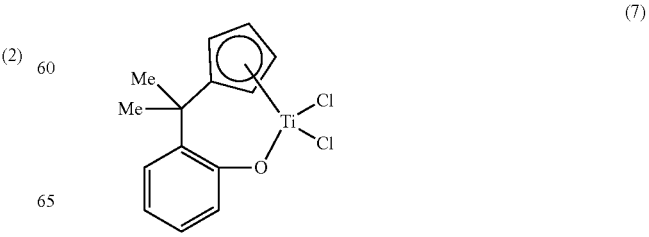

(7)

-continued (8)

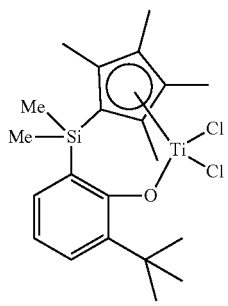

Compound (5) has been reported by T. J. Marks et al. and is characterized in that a cyclopentadiene (Cp) derivative and an oxido ligand are bridged via an ortho-phenylene group (Organometallics 1997, 16, 5958). A compound having the same bridged group and polymerization using thereof have been reported by Mu et al. (Organometallics 2004, 23, 540). In addition, the bridging of an indenyl ligand and an oxido ligand by the same ortho-phenylene group has been reported by Rothwell et al. (Chem. Commun. 2003, 1034). Compound (6) has been reported by Whitby et al. and is characterized in that a cyclopentadienyl ligand and an oxido ligand are bridged by three carbon atoms (Organometallics 1999, 18, 348). The above catalysts have been reported to show activity in syndiotactic polystyrene polymerization. Similar compounds have been also reported by Hessen et al. (Organometallics 1998, 17, 1652). Compound (7) has been reported by Rau et al. and is characterized in showing activity in ethylene polymerization and ethylene/1-hexene copolymerization at a high temperature and a high pressure (210° C., 150 MPa) (J. Organomet. Chem. 2000, 608, 71). In addition, the synthesis of a catalyst (8) having a similar structure as that of Compound (7) and polymerization using the same at a high temperature and a high pressure have been filed by Sumitomo Co. (U.S. Pat. No. 6,548,686). However, not many catalysts among the above attempts are practically applied in commercial plants. Accordingly, a catalyst which shows even further improved polymerization capacity is required, and a method for simply preparing such catalyst is required.

PRIOR ART DOCUMENTS

Patent Documents (Patent Document 1) U.S. Pat. Registration No. 5,064,802
(Patent Document 2) U.S. Pat. Registration No. 6,015,916
(Patent Document 3) U.S. Pat. Registration No. 6,548,686
(Patent Document 4) International Laid-open Publication No. 2008/084931

Non-patent Documents (Non-patent Document 1) Chem. Rev. 2003, 103, 283
(Non-patent Document 2) Organometallics 1997, 16, 5958
(Non-patent Document 3) Organometallics 2004, 23, 540
(Non-patent Document 4) Chem. Commun. 2003, 1034
(Non-patent Document 5) Organometallics 1999, 18, 348
(Non-patent Document 6) Organometallics 1998, 17, 1652
(Non-patent Document 7) J. Organomet. Chem. 2000, 608, 71

DISCLOSURE OF THE INVENTION

Technical Problem

The present invention is to provide a transition metal compound having a novel structure and excellent copolymerization properties, which is capable of preparing an olefin polymer with a ultra low density and high molecular weight, a catalyst composition including same, and a method for preparing a polymer using same.

Technical Solution

In order to solve the above-described tasks, an embodiment of the present invention provides a transition metal compound represented by the following Formula 1:

[Formula 1]

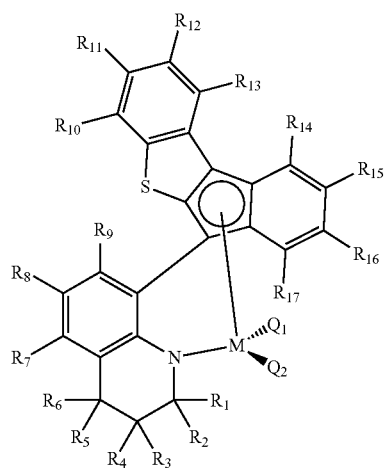

In Formula 1,
$R_1$ to $R_6$ are each independently hydrogen; $-NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; a substituted or unsubstituted alkoxy group of 1 to 20 carbon atoms; or a substituted or unsubstituted aryl group of 6 to 20 carbon atoms,
$R_7$ to $R_{17}$ are each independently hydrogen; $-NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; an unsubstituted or substituted alkoxy group of 1 to 20 carbon atoms; or a substituted or unsubstituted aryl group of 6 to 20 carbon atoms,
M is a transition metal in group 4;
$Q_1$ and $Q_2$ are each independently hydrogen; halogen; $-NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; or a substituted or unsubstituted aryl group of 6 to 20 carbon atoms,
a substituent of the substituted groups of $R_1$ to $R_{17}$, $Q_1$ and $Q_2$ is selected from the group consisting of $-NR_aR_b$, an alkyl group of 1 to 10 carbon atoms, a cycloalkyl group of 3 to 20 carbon atoms, an aryl group of 6 to 20 carbon atoms and an alkoxy group of 1 to 10 carbon atoms, and $R_a$ and $R_b$ are each independently hydrogen; an alkyl group of 1 to 10 carbon atoms; a cycloalkyl group of 3 to 10 carbon atoms; or an aryl group of 6 to 20 carbon atoms.

In order to solve the above-described tasks, another embodiment of the present invention provides a catalyst composition including the above-described transition metal compound of Formula 1.

In order to solve the above-described tasks, another embodiment of the present invention provides a method for preparing an olefin polymer, including a step of polymerizing a monomer mixture including an olefin monomer in the presence of the above-described catalyst composition.

Advantageous Effects

The transition metal compound according to the present invention has a novel structure having further improved structural stability through the formation of a stable coordination site of a transition metal and the control of a bond angle at the same time, and may produce an olefin polymer having excellent copolymerization properties, and thus having a high molecular weight in a ultra low density region.

BEST MODE FOR CARRYING OUT THE INVENTION

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

The term "composition" used in the present disclosure includes a mixture of materials including the corresponding composition as well as a reaction product and decomposition product formed from materials of the corresponding composition.

The term "polymer" used in the present disclosure refers to a polymer compound prepared by polymerizing monomers, irrespective of the same or different kinds. Such a general term of polymer includes the term of homopolymer used for referring to a polymer prepared from only one kind of monomer and the term of interpolymer specified as follows.

The term "interpolymer" used in the present disclosure refers to a polymer prepared by polymerizing at least two different kinds of monomers. Like this, a general term of interpolymer includes copolymer which is commonly used to refer to a polymer prepared from two different kinds of monomers, and a polymer prepared from two or more different kinds of monomers.

In the present disclosure, each of an alkyl group and an alkenyl group may be a linear chain or a branched chain.

In the present disclosure, an aryl group includes monocyclic or polycyclic aryl, particularly, phenyl, naphthyl, anthryl, phenanthryl, chrysenyl, pyrenyl, etc.

The terms "comprising", "including", and "having" and the derivatives thereof, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

"Weight average molecular weight (g/mol), number average molecular weight and molecular weight distribution (MWD)" may be obtained by measuring a number average molecular weight (Mn) and a weight average molecular weight (Mw), respectively, by gel permeation chromatography (GPC, GPC220, Agilent Technologies 1260 Infinity II High temperature GPC system) under the conditions below, and the molecular weight distribution may be calculated by dividing the weight average molecular weight by the number average molecular weight.

Particularly, PL Olexis (Polymer Laboratories Co.) may be used as a column, trichlorobenzene (TCB) may be applied as a solvent, and measurement may be performed under conditions of a flow rate of 1.0 ml/min, a specimen concentration of 1.0 mg/ml, an injection amount of 200 μl, and a column temperature: 160° C. The molecular weights may be derived by calibrating (polystyrene standard) by tertiary function using a detector (Detector, Agilent High Temperature RI detector).

"Density (g/cm$^3$)" may be obtained by manufacturing a sample using a press mold at 180° C. into a sheet having a thickness of 3 mm and a radius of 2 cm according to ASTM D-792, cooling in a rate of 10° C./min and measuring on a Mettler balance.

"Melt index (MI2.16, g/10 min)" may be obtained by measuring melt index (MI) according to ASTM D-1238 (condition E, 190° C., 2.16 kg load), and "Melt flow rate ratio (MFPR, MI10/2.0)" may be obtained by measuring melt indexes (MI) according to ASTM D-1238 (condition E, 190° C., 2.16 kg load and 10 kg load) and expressing as a ratio of two melt indexes.

"Melting temperature (Tm, ° C.)" is measured as the melting temperature of a polymer using a differential scanning calorimeter, (DSC, apparatus name: DSC 2920, manufacturer: TA instrument). Particularly, a polymer is heated to 150° C., this temperature is kept for 5 minutes, the temperature is decreased to −100° C., and the temperature is increased again, where the increasing rate and decreasing rate of the temperature is controlled to 10° C./min, respectively, and the melting temperature is the maximum point of an absorption peak measured in the second increasing section of the temperature.

"Crystallization temperature (Tc, ° C.)" is obtained by performing the same method as the measurement of the melting temperature using DSC and measuring the maximum point of a heating peak from a curve shown while decreasing the temperature.

Hereinafter, the present invention will be explained in more detail to assist the understanding of the present invention.

Transition Metal Compound

According to an embodiment of the present invention, there is provided a transition metal compound of the following Formula 1:

[Formula 1]

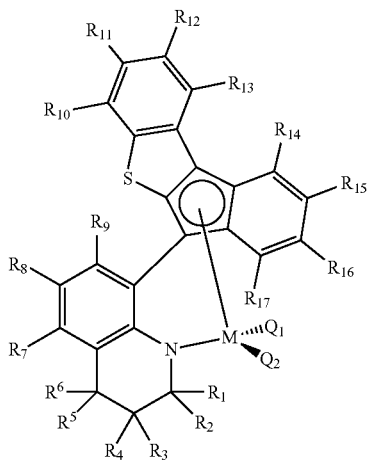

In Formula 1,
$R_1$ to $R_6$ are each independently hydrogen; —$NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; a substituted or unsubstituted alkoxy group of 1 to 20 carbon atoms; or a substituted or unsubstituted aryl group of 6 to 20 carbon atoms, $R_7$ to $R_{17}$ are each independently hydrogen; —$NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; a substituted or unsubstituted alkoxy group of 1 to 20 carbon atoms; or a substituted or unsubstituted aryl group of 6 to 20 carbon atoms, M is a transition metal in group 4;

$Q_1$ and $Q_2$ are each independently hydrogen; halogen; —$NR_aR_b$; a substituted or unsubstituted alkyl group of 1 to 20 carbon atoms; a substituted or unsubstituted cycloalkyl group of 3 to 20 carbon atoms; a substituted or unsubstituted alkenyl group of 2 to 20 carbon atoms; or a substituted or unsubstituted aryl group of 6 to 20 carbon atoms, a substituent of the substituted alkyl group, the substituted cycloalkyl group, the substituted alkenyl group, the substituted alkoxy group and the substituted aryl group of $R_1$ to $R_{17}$, $Q_1$ and $Q_2$ is selected from the group consisting of —$NR_aR_b$, an alkyl group of 1 to 10 carbon atoms, a cycloalkyl group of 3 to 20 carbon atoms, an aryl group of 6 to 20 carbon atoms and an alkoxy group of 1 to 10 carbon atoms, and $R_a$ and $R_b$ are each independently hydrogen; an alkyl group of 1 to 10 carbon atoms; a cycloalkyl group of 3 to 10 carbon atoms; or an aryl group of 6 to 20 carbon atoms.

In the transition metal compound of Formula 1 described in the present disclosure, a metal site is connected by a cyclopentadienyl (Cp) ligand and an amino group which is fused to a phenylene bridge in a ring shape, and its structure has a narrow Cp-M-N angle and a wide $Q_1$-M-$Q_2$ angle to which a monomer may approach. Particularly, benzothiophene and benzene are fused to both sides of the cyclopentadienyl ring, respectively, and the Cp-M-N angle may decrease further.

In addition, different from a CGC structure connected by a silicon bridge, in the compound structure represented by Formula 1, cyclopentadiene to which benzothiophene is fused by a ring-type bond, a phenylene bridge, nitrogen and a metal site are connected in order, and a more stable and rigid pentagonal ring structure may be formed, and a benzene ring is additionally fused to the cyclopentadienyl ring, and this pentagonal ring structure may have a more rigid structure.

Accordingly, if applying the compounds to olefin polymerization after reacting with a cocatalyst such as methyl aluminoxane and $B(C_6F_5)_3$ and activating, an olefin polymer having high activity, high molecular weight and high copolymerization degree may be produced even at a high polymerization temperature. Particularly, since a large amount of alpha-olefin may be introduced as well as a linear polyethylene having a low density degree of 0.910-0.930 g/cc due to the structural characteristics of the catalyst, a polyolefin copolymer having a ultra low density of less than 0.910 g/cc, less than 0.890 g/cc, down to 0.850 g/cc may be produced.

Particularly, the transition metal compound may introduce various substituents to a benzene ring (positioned at the opposite side of benzothiophene) which is fused to the cyclopentadienyl ring, and this may ultimately control electronic and steric environment around a metal and may control the structure and physical properties of polyolefin produced. For example, in case of the benzene ring fused at the opposite side of the fused position of the benzothiophene of the cyclopentadienyl ring, outstanding effects for stabilizing an unstable transition metal (Ti, etc.) may be shown, because this benzene ring has a structure having pi electrons with a planar structure. Accordingly, significant improvement of copolymerization properties may be expected, additionally, a Cp-M-N bond angle may be more easily controlled, and copolymerization properties may be improved further. Therefore, a copolymer having a high molecular weight and ultra low density may be prepared.

The compound of Formula 1 may preferably be used for preparing a catalyst for polymerizing an olefin monomer, but may be applied in all fields where the transition metal compound may be used, without limitation.

According to an embodiment of the present invention, in Formula 1, $R_1$ to $R_6$ may be each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, $R_7$ to $R_{17}$ may be each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, M may be Ti, Hf or Zr, and $Q_1$ and $Q_2$ may be each independently hydrogen; halogen; a substituted or unsubstituted alkyl group of 1 to 20 carbon atoms; a substituted or unsubstituted cycloalkyl group of 3 to 20 carbon atoms; or an unsubstituted aryl group of 6 to 20 carbon atoms.

If each substituent is "substituted" as described above, the substituent may be selected from the group consisting of —$NR_aR_b$, an alkyl group of 1 to 10 carbon atoms, a cycloalkyl group of 3 to 20 carbon atoms, an aryl group of 6 to 20 carbon atoms and an alkoxy group of 1 to 10 carbon atoms, and $R_a$ and $R_b$ are the same as referred to in Formula 1.

According to an embodiment of the present invention, in order to further improve the copolymerization properties of the transition metal compound, preferably, $R_1$ to $R_6$ may be each independently hydrogen; an alkyl group of 1 to 10 carbon atoms; a cycloalkyl group of 3 to 10 carbon atoms; or an aryl group of 6 to 20 carbon atoms, $R_7$ to $R_{17}$ may be each independently hydrogen; an alkyl group of 1 to 10 carbon atoms; a cycloalkyl group of 3 to 10 carbon atoms; or an aryl group of 6 to 20 carbon atoms, and $Q_1$ and $Q_2$ may be each independently hydrogen; halogen; an alkyl group of 1 to 10 carbon atoms; a cycloalkyl group of 3 to 10 carbon atoms; or an aryl group of 6 to 20 carbon atoms. That is, all substituents may preferably not be substituted but be unsubstituted considering the improvement of copolymerization properties.

Particularly, $R_1$ to $R_6$ may be each independently hydrogen; or an alkyl group of 1 to 10 carbon atoms, and particularly, one or more among $R_1$ to $R_6$ may be an alkyl group of 1 to 10 carbon atoms. Preferably, $R_2$ to $R_6$ may be hydrogen, $R_1$ may be hydrogen or an alkyl group of 1 to 10 carbon atoms. If $R_1$ is an alkyl group of 1 to 10 carbon atoms, carbon bonded thereto may become chiral carbon, and accordingly, the copolymerization properties of the transition metal compound may be improved. In addition, all $R_1$ to $R_6$ may be hydrogen, and in this case, the copolymerization properties may be optimized.

$R_7$ to $R_{17}$ may be each independently hydrogen; or an alkyl group of 1 to 10 carbon atoms. By introducing an appropriate branch-type or linear-type bulky substituent to $R_7$ to $R_{17}$, the molecular structure of the whole transition metal compound may be easily controlled through the deformation of the position of a phenylene bridge or sterical structure of a fused ring.

M is a transition metal and may be a transition metal in group 4, and may be Ti, Zr or Hf, preferably, Ti.

$Q_1$ and $Q_2$ may be each independently hydrogen; halogen; or an alkyl group of 1 to 10 carbon atoms. $Q_1$ and $Q_2$ are substituents bonded to a transition metal and are positioned at the front line of a pathway where a monomer approaches, in case where the transition metal compound acts as a catalyst. Accordingly, $Q_1$ and $Q_2$ are required to be selected as suitable substituents controlling the independent reactivity of the transition metal and not preventing the approach of a monomer.

The transition metal compound may be selected from a compound of the following Formula 1-1 or a compound of the following Formula 1-2:

[Formula 1-1]

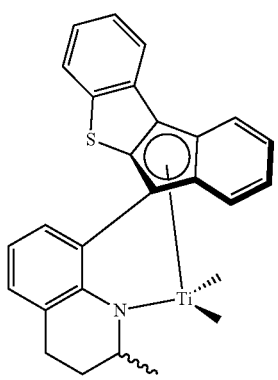

[Formula 1-2]

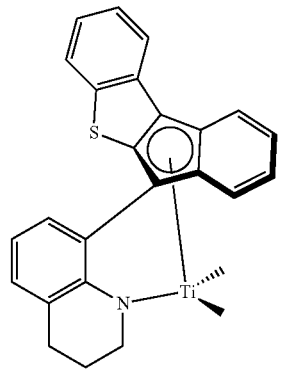

Method for Preparing Transition Metal Compound

The compound of Formula 1 may be prepared by the following steps a) to d):

a) a step of reacting an amine-based compound represented by Formula 2 below and an alkyllithium, and adding a compound including a protecting group (—$R_0$) to prepare a compound represented by Formula 3 below;

b) a step of reacting the compound represented by Formula 3 with an alkyllithium, and adding a ketone-based compound represented by Formula 4 below to prepare an amine-based compound represented by Formula 5 below;

c) a step of reacting a compound represented by Formula 5 with n-butyllithium to prepare a dilithium compound represented by Formula 6 below; and d) a step of reacting a compound represented by Formula 6, $MCl_4$ (M=transition metal in group 4) and an organometallic compound to prepare a transition metal compound represented by Formula 1.

[Formula 2]

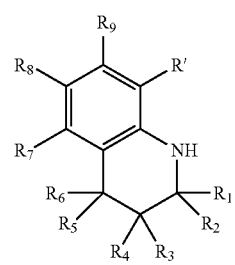

[Formula 3]

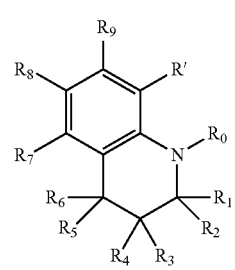

[Formula 4]

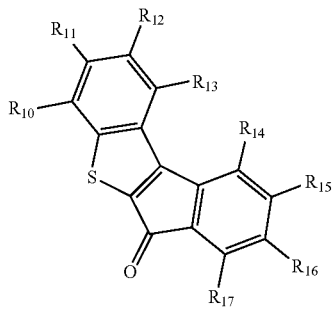

[Formula 5]

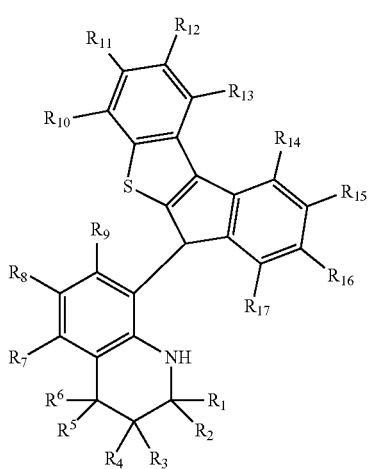

[Formula 6]

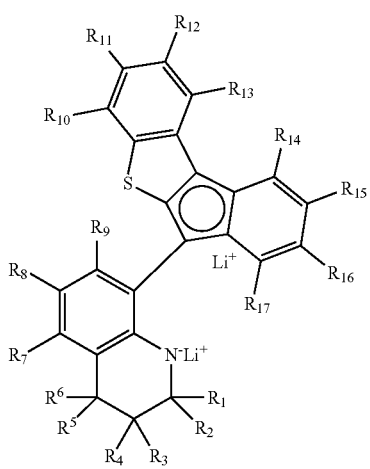

In Formulae 2 to 6, R' is hydrogen, $R_0$ is a protecting group, and other substituents are the same as defined in Formula 1.

In the step a), the compound including the protecting group may be selected from trimethylsilyl chloride, benzyl chloride, t-butoxycarbonyl chloride, benzyloxycarbonyl chloride and carbon dioxide.

If the compound including the protecting group is carbon dioxide, Formula 3 may be a lithium carbamate compound represented by the following Formula 3a:

[Formula 3a]

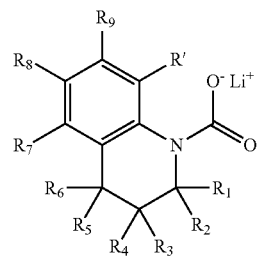

The explanation on the substituent is the same as defined in Formula 2.

In addition, the organometallic compound in the step d) may be an organomagnesium compound, or a Grignard reagent inducing Grignard reaction.

If the preparation method is briefly expressed by simplifying all substituents, the preparation method may be expressed through a mechanism as the following Reaction 1, and through such a method, the compound of Formula 1 may be prepared.

[Reaction 1]

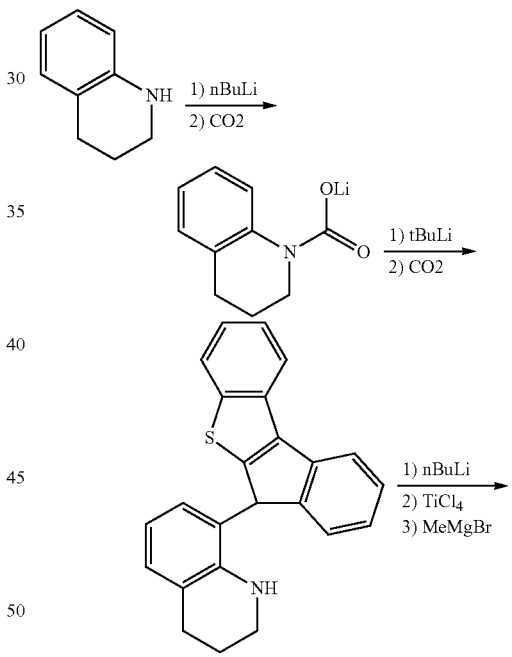

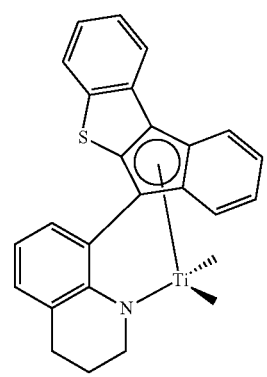

Catalyst Composition

According to an embodiment of the present invention, there is provided a catalyst composition including the compound of Formula 1.

The catalyst composition may further include a cocatalyst. As the cocatalyst, any one known in the technical field may be used.

For example, the catalyst composition may further include at least one among the following Formulae 7 to 9 as the cocatalyst:

$$—[Al(R_{22})—O]_a—$$ [Formula 7]

where each $R_{22}$ is independently a halogen radical; a hydrocarbyl radical of 1 to 20 carbon atoms; or a halogen-substituted hydrocarbyl radical of 1 to 20 carbon atoms; and a is an integer of 2 or more;

$$D(R_{22})_3$$ [Formula 8]

where D is aluminum or boron; and each $R_{22}$ is independently the same as defined above;

$$[L-H]^+[Z(A)_4]^- \text{ or } [L]^+[Z(A)_4]^-$$ [Formula 9]

where L is a neutral or a cationic Lewis acid; H is a hydrogen atom; Z is an element in group 13; and each A is independently aryl of 6 to 20 carbon atoms or alkyl of 1 to carbon atoms, where one or more hydrogen atoms may be substituted with substituents; wherein the substituent is halogen, hydrocarbyl of 1 to 20 carbon atoms, alkoxy of 1 to 20 carbon atoms, or aryloxy of 6 to 20 carbon atoms.

As the method for preparing the catalyst composition, there is provided a first preparation method including a step of obtaining a mixture by contacting the transition metal compound represented by Formula 1 with the compound represented by Formula 7 or Formula 8; and a step of adding the compound represented by Formula 9 to the mixture.

Also, there is provided a second preparation method of the catalyst composition including contacting the transition metal compound represented by Formula 1 with the compound represented by Formula 9.

In the first method among the preparation methods of the catalyst composition, the molar ratio of the compound represented by Formula 7 or Formula 8 with respect to the transition metal compound represented by Formula 1 may preferably be from 1:2 to 1:5,000, more preferably, from 1:10 to 1:1,000, most preferably, from 1:20 to 1:500.

Meanwhile, the molar ratio of the compound represented by Formula 9 with respect to the transition metal compound represented by Formula 1 may preferably be from 1:1 to 1:25, more preferably, from 1:1 to 1:10, most preferably, from 1:1 to 1:5.

If the molar ratio of the compound represented by Formula 7 or Formula 8 with respect to the transition metal compound represented by Formula 1 is less than 1:2, the amount of an alkylating agent is very small, and the alkylation of the metal compound may be incompletely achieved, and if the molar ratio is greater than 1:5,000, the alkylation of the metal compound may be performed, but side reactions between the remaining excessive amount of alkylating agent and the activating agent of Formula 9 may be performed, and the activation of the alkylated metal compound may be incompletely achieved. In addition, if the molar ratio of the compound represented by Formula 9 with respect to the transition metal compound of Formula 1 is less than 1:1, the amount of the activating agent is relatively small, the activation of the metal compound may be incompletely achieved, and the activity of the catalyst composition thus prepared may be reduced, and if the molar ratio is greater than 1:25, the activation of the metal compound may be completely achieved, but the excessive amount of activating agent remained may increase the unit cost of the catalyst composition or decrease the purity of the polymer thus prepared.

In the second method among the preparation methods of the catalyst composition, the molar ratio of the compound represented by Formula 9 with respect to the transition metal compound of Formula 1 may preferably be from 1:1 to 1:500, more preferably, from 1:1 to 1:50, most preferably, from 1:2 to 1:25. If the molar ratio is less than 1:1, the amount of the activating agent is relatively small, the activation of the metal compound may be incompletely achieved, and the activity of the catalyst composition thus prepared may be reduced, and if the molar ratio is greater than 1:500, the activation of the metal compound may be completely achieved, but the excessive amount of activating agent remained may increase the unit cost of the catalyst composition or decrease the purity of the polymer thus prepared.

As the reaction solvent used during the preparation of the composition, a hydrocarbon solvent such as pentane, hexane and heptane, or an aromatic solvent such as benzene and toluene may be used, but the present invention is not limited thereto, and all solvents used in this technical field may be used.

In addition, the transition metal compound of Formula 1 and the cocatalyst may be used in a supported type by a support. Silica or alumina may be used as the support.

The compound represented by Formula 7 is not specifically limited as long as alkylaluminoxane is used. Preferable examples thereof may include methylaluminoxane, ethylaluminoxane, isobutylaluminoxane, butylaluminoxane, etc., more preferably, methylaluminoxane.

The compound represented by Formula 8 is not specifically limited, and preferable examples thereof may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more preferably, selected from trimethylaluminum, triethylaluminum, and triisobutylaluminum.

Examples of the compound represented by Formula 9 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o, p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o, p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, etc.

Method for Preparing Olefin Polymer

According to an embodiment of the present invention, there is provided a method for preparing an olefin polymer, including a step of polymerizing a monomer mixture including an olefin monomer in the presence of the catalyst composition including the transition metal compound represented by Formula 1; and one or more compounds selected from the compounds represented by Formula 7 to Formula 9.

The monomer mixture may further include an alpha olefin comonomer, and according to the monomer mixture, the olefin polymer may become an olefin homopolymer or an olefin-alpha olefin copolymer.

The most preferable polymer preparation process using the catalyst composition is a solution process. If the catalyst composition is used together with an inorganic support such as silica, it may also be applied to a slurry process or a gas phase process.

In the preparation process of a polymer, the activated catalyst composition may be injected after being dissolved or diluted in an aliphatic hydrocarbon solvent of 5 to 12 carbon atoms such as pentane, hexane, heptane, nonane, decane, isomers thereof, an aromatic hydrocarbon solvent such as toluene and benzene, or a hydrocarbon solvent substituted with a chlorine atom such as dichloromethane and chlorobenzene, which are suitable for an olefin polymerization process. The solvent used may preferably be used after removing a small amount of water or air, which functions as a catalyst poison, by treating with a small amount of alkylaluminum, and may be used by further using a cocatalyst.

The monomer which may be included in the monomer mixture polymerizable using the metal compound and the cocatalyst may include ethylene, alpha-olefin, cyclic olefin, etc., and a diene olefin-based monomer, a triene olefin-based monomer, etc. having two or more double bonds, may also be polymerized. Particular examples of the monomer may include ethylene, or propylene as an olefin monomer, 1-butene, 1-pentene, 4-methyl-1-pentene, 1-hexene, 1-heptene, 1-octene, 1-decene, 1-undecene, 1-dodecene, 1-tetradecene, 1-hexadecene, 1-icocene, etc., as an alpha olefin monomer, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methyl styrene, divinylbenzene, 3-chloromethylstyrene, etc. as a diene monomer. Two or more of the monomers may be mixed and copolymerized, and three or more thereof may be mixed to prepare an interpolymer.

Particularly, in the preparation method of the present invention, the catalyst composition including the transition metal compound of Formula 1 has characteristics of preparing a copolymer having a ultra low density of a polymer density of 0.91 g/cc or less while having a high molecular weight, in the copolymerization reaction of ethylene and a monomer having large steric hindrance such as 1-octene even at a high reaction temperature of 90° C. or more.

According to an embodiment, the polymer prepared by the preparation method of the present invention may have a density of less than 0.91 g/cc.

According to another embodiment, the polymer prepared by the preparation method of the present invention may have a density of less than 0.89 g/cc.

According to an embodiment, the polymer prepared by the preparation method of the present invention may have a density of 0.88 g/cc or less, preferably, 0.87 g/cc or less.

According to an embodiment, the polymer prepared by the preparation method of the present invention has Tc of 75° C. or less.

According to an embodiment, the polymer prepared by the preparation method of the present invention has Tm of 95° C. or less.

According to an embodiment, the polymer prepared by the preparation method of the present invention has Tm of 91° C. or less.

According to an embodiment, the polymer prepared by the preparation method of the present invention has Tm of less than 87° C.

According to an embodiment of the present invention, the polymer prepared by the preparation method of the present invention may have a weight average molecular weight (Mw) of 100,000 or more, or 100,000 to 1,000,000, if measured by polystyrene conversion gel permeation chromatography. By utilizing the catalyst composition including the transition metal compound of Formula 1, an olefin polymer in a high molecular weight region may be prepared, and such a polymer has a ultra low density properties, and thus may accomplish significantly excellent physical properties if applied to a hot melt adhesive, compound, film, etc.

According to an embodiment of the present invention, the polymer prepared by the preparation method of the present invention may have molecular weight distribution (MWD) of 3 or less, 1 to 3, preferably, 1.5 to 2.9, or 2 to 2.85, and thus, processability may be excellent, and the reproducibility for accomplishing the physical properties of applied products may be increased.

EXAMPLES

Hereinafter, the present invention will be explained more particularly referring to the examples. However, the examples are for assisting the understanding of the present invention, and the scope of the present invention is not limited thereto.

Organic reagents and solvents in the Synthetic Examples and Examples were purchased from Aldrich Co. and used after purifying by standard methods unless otherwise noted.

1. Synthesis of Transition Metal Compounds

Synthetic Example 1

Preparation of Compound of Formula 1-1

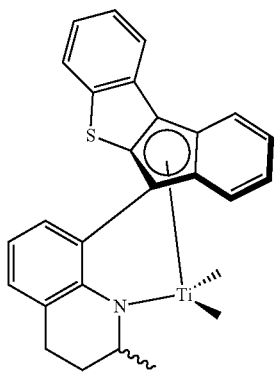

1) Synthesis of Ligand Compound 2-methyl-1,2,3,4-tetrahydroquinoline (2 g, 2.25 mmol) and diethyl ether (50 ml) were put in a Schlenk flask. The Schlenk flask was dipped in a low-temperature bath cooled to −78° C. using dry ice and acetone, and the reactants were stirred for 30 minutes. Then, n-BuLi (n-butyllithium, 9.8 ml, 2.5 M, 24.6 mmol) was injected using a syringe under an argon atmosphere, and a pale yellow slurry was formed. After that, the flask was stirred for 17 hours, and the temperature of the flask was increased to room temperature while removing a butane gas produced. The flask was dipped in the low-temperature bath to decrease the temperature to −78° C. again, and a $CO_2$ gas was injected. According to the injection of the carbon dioxide gas, the slurry disappeared, and a transparent solution was obtained. The flask was connected to a bubbler and the temperature was increased to room temperature while removing carbon dioxide. After that, remaining $CO_2$ gas and solvents were removed in vacuum. After transporting the flask into a dry box, pentane was applied and then the resultant product was vigorously stirred and filtered to obtain lithium carbamate (lithium 2-methyl-3,4-dihydroquinoline-1(2H)-carboxylate) of a white solid compound. In the white solid compound, diethyl ether made a coordination bond. In this case, yield was 100%.

The lithium carbamate compound (3.91 g, 21.36 mmol) thus prepared was put in a Schlenk flask. Then, tetrahydrofuran (2 g, 27.77 mmol) and 45 ml of diethyl ether were added one by one. To a low-temperature bath cooled to −20° C. using acetone and a small amount of dry ice, the Schlenk flask was dipped and stirred for 30 minutes. Then, tert-BuLi (17 ml, 28.84 mmol) was put. In this case, the color of the reaction mixture changed to red. Stirring was performed for 3 hours while keeping −20° C. Lithium bromide (LiBr) (3.15 g, 36.3 mmol) dissolved in 15 ml of tetrahydrofuran and 6H-benzo[b]indeno[1,2-d]thiophen-6-on (3 g, 13.88 mmol) were mixed in a syringe and then injected into the flask under an argon atmosphere. The reaction was performed for 17 hours while keeping −20° C., and then, a thermostat was removed, and the temperature was kept to room temperature. Then, water (15 ml) was added to the flask, and dimethyl chloride was added. The resultant mixture was transported to a separating funnel, and hydrochloric acid (3 N, 50 ml) was added, followed by shaking for 12 minutes. A saturated sodium hydrogen carbonate aqueous solution (100 ml) was added to neutralize, and an organic layer was extracted. Anhydrous magnesium sulfate was added to the organic layer to remove moisture, and filtering was performed. The filtrate was taken, and solvents were removed. The filtrate thus obtained was separated by column chromatography using hexane and dimethyl chloride (v/v, 10:1) solvents to obtain a yellow solid. Yield was 57.15%.

$^1$H NMR($C_6D_6$, $C_5D_5N$): δ 0.776-0.789 (d, 3H, quin-3H), 2.484-2.583 (br, 2H, quin-$CH_2$) 2.976 (br s, 1H, quin-$CH_2$), 4.823-4.801 (br, 1H, quin) 6.294-6.278 (d, 1H, Aromatic), 6.709-6.694 (t, 1H, Aromatic), 6.933-6.918 (d, 1H, Aromatic), 7.012-7.258 (d, 6H, Aromatic), 7.742-7.728 (d, 1H, Aromatic), 8.046-8.031 (d, 1H, Aromatic) ppm.

2) Synthesis of Transition Metal Compound of Formula 1-1

In a dry box, 8-(10H-benzo[b]indeno[1,2-d]thiophen-10-yl)-2-methyl-1,2,3,4-tetrahydroquinoline (1 g, 3.02 mmol) prepared in 1) and 30 ml of diethyl ether were added to a round flask, the temperature was decreased to −30° C., and MeMgBr (11.3 ml, 1.6 M, 18.1 mmol) was slowly added while stirring. The reaction was performed for 17 hours while increasing the temperature to room temperature. The temperature of the flask was decreased to −30° C., $TiCl_4$ (3.02 ml, 1 M, 3.02 mmol) was slowly added at −30° C. while stirring, and the reaction mixture was stirred for 6 hours while increasing the temperature to room temperature. After finishing the reaction, vacuum was applied, and solvents were removed, and then, the resultant product was dissolved in toluene and filtered, and the filtrate was taken. Toluene was removed by applying vacuum to obtain a yellowish brown compound (786.3 mg). Yield was 63.9%.

$^1$H NMR($C_6D_6$) δ 7.974-7.936 (d, 2H, Ar—H), 7.204-6.776 (m, 9H, Ar—H), 5.168-5.159 (m, 1H, quin-CH), 2.650-2.620 (t, 2H, quin), 1.543-1.518 (t, 2H, quin), 1.102-1.089 (d, 3H, quin-$CH_3$), 0.296 (s, Ti—$CH_3$), 0.140 (s, Ti—$CH_3$), 0.114 (s, Ti—$CH_3$), 0.064 (s, Ti—$CH_3$) ppm.

Synthetic Example 2

Synthesis of Compound of Formula 1-2

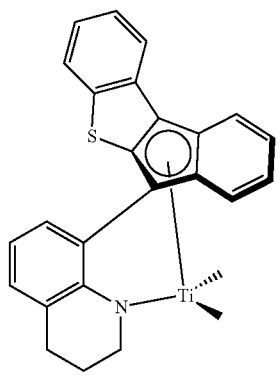

1) Synthesis of Ligand Compound

A ligand compound was obtained by the same method as Synthetic Example 1 except for injecting 1,2,3,4-tetrahydroquinoline instead of 2-methyl-1,2,3,4-tetrahydroquinoline to a Schlenk flask in Synthetic Example 1. Yield was 40%.

$^1$H NMR(C$_6$D$_6$, C$_5$D$_5$N): δ 0.832-0.860 (t, 1H, Cp-1H), 1.617-1.606 (m, 2H, quinH), 2.523-2.161 (br, 3H, quin-CH$_2$) 4.751-4.607 (br, 1H, quin-CH$_2$), 7.204-6.609 (d, 9H, Aromatic), 7.704-7.688 (d, 1H, Aromatic), 8.003-7.987 (d, 1H, Aromatic) ppm.

2) Synthesis of Transition Metal Compound of Formula 1-2

The transition metal compound of Formula 1-2 was obtained by the same method as 2) in Synthetic Example 1. Yield was 65.3%.

$^1$H NMR(C$_6$D$_6$) δ 8.047-8.031 (d, 2H, Ar—H), 7.982-7.932 (m, 3H, Ar—H), 7.747-7.733 (d, 2H, Ar—H), 7.206-6.776 (m, 4H, Ar—H), 4.281-4.280 (m, 2H, quin-CH$_2$), 2.386-2.362 (t, 2H, quin), 1.552-1.543 (t, 2H, quin), 0.206 (s, 3H, Ti—CH$_3$), 0.089 (s, 3H, Ti—CH$_3$) ppm.

Comparative Synthetic Examples 1 to 5

The contact of air and moisture was blocked in all steps of synthesis to increase the reproducibility of an experiment. Compound A of Comparative Example 1 was CGC [Me$_2$Si(Me$_4$C$_5$)NtBu]TiMeI$_2$ (Constrained-Geometry Catalyst, hereinafter, abbreviated as CGC), Compound E of Comparative Example 5 was synthesized by a known method according to U.S. Pat. Registration No. 6,015,916, and Compounds B, C and D of Comparative Examples 2 to 4 were synthesized by known methods according to Korean Patent Registration No. 10-1528102 (Compounds 1 to 3, respectively).

[Compound A]

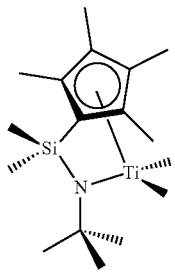

[Compound B]

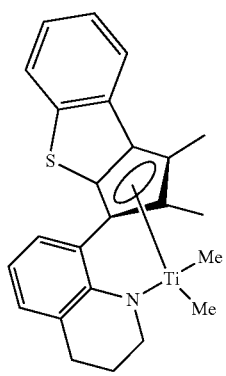

[Compound C]

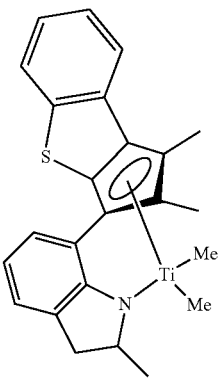

[Compiund D]

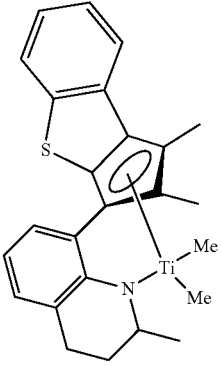

[Compound E]

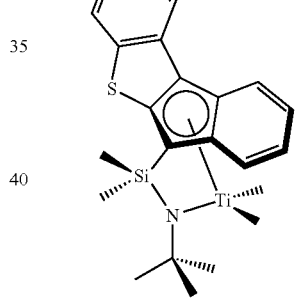

2. Preparation of Olefin Polymer

Examples 1 and 2, and Comparative Examples 1 to 4

To a 2 L, autoclave reactor, a hexane solvent (1.0 L) and 200 ml of 1-octene (purity 90%) were added, and the temperature of the reactor was pre-heated to 150° C. At the same time, the pressure of the reactor was set in advance using ethylene (35 bar). Each transition metal compound (3.0 umol) synthesized in each of the Synthetic Examples and Comparative Synthetic Examples, treated with 0.8 mmol of triisobutyl aluminum (TiBAL) and a dimethylanilinium tetrakis(pentafluorophenyl) borate cocatalyst (10 eq) were put in the reactor one by one by applying a high-pressure argon (molar ratio of Al:Ti=10:1). Then, copolymerization reaction was performed for 8 minutes. After that, remaining ethylene gas was exhausted, and a polymer solution was added to an excessive amount of ethanol to induce precipitation. The precipitated polymer was washed with ethanol and acetone twice or three times, respectively, and dried in a vacuum oven of 80° C. for 12 hours or more, and physical properties were measured.

Comparative Example 5

A polymer was obtained by the same method as Example 1 except for using Compound E instead of the compound of Synthetic Example 1 and applying 240 ml of 1-octene in Example 1.

3. Evaluation of Physical Properties

1) Density (g/cm$^3$): According to ASTM D-792, a sheet having a thickness of 3 mm and a radius of 2 cm was manufactured using a press mold at 180° C. as a sample, cooled in 10° C./min, and measured on a Mettler balance.

2) Melt index (MI2.16, g/10 min): Melt index (MI) was measured according to ASTM D-1238 (condition E, 190° C., 2.16 kg load).

3) Melt flow rate ratio (MFRR, MI10/2.0): Melt indexes (MI) were measured according to ASTM D-1238 (condition E, 190° C., 2.16 kg load and 10 kg load), and a ratio of two melt indexes was shown.

4) Melting temperature (Tm, ° C.): The melting temperature of a polymer was measured using a differential scanning calorimeter (DSC, apparatus name: DSC 2920, manufacturer: TA instrument). Particularly, a polymer was heated to 150° C., this temperature was kept for 5 minutes, the temperature was decreased to −100° C., and the temperature was increased again. In this case, the increasing rate and decreasing rate of the temperature were controlled to 10° C./min, respectively. The melting temperature was set to the maximum point of an absorption peak measured in the second increasing section of the temperature.

5) Crystallization temperature (Tc, ° C.): Obtained by performing the same method as the measurement of the melting temperature using DSC, and the maximum point of a heating peak from a curve shown while decreasing the temperature was set as the crystallization temperature.

4. Evaluation Results of Physical Properties

The physical properties of the polymers prepared in Examples 1 and 2, and Comparative Examples 1 to 5 are shown in Table 1 below.

Referring to Table 1, in case of Examples 1 and 2, applied to polymerization after synthesizing according to an embodiment of the present invention, it could be confirmed that polymers having a high molecular weight with a high weight average molecular weight was prepared in view of the low melt index, and through this, it could be inferred that a product having excellent rigidity may be obtained. In addition, in case of Examples 1 and 2, very transparent polymers were obtained, and this is thought that the polymers had a ultra low density of about 0.860 g/cm$^3$. Through this, it could be expected that excellent optical properties and excellent impact absorbing capacity may be achieved at the same time.

On the contrary, in case of all Comparative Examples 1 to 5, using the conventional catalyst compositions, the density was significantly high, and particularly, it could be confirmed that Comparative Example 1 showed markedly small molecular weight and extremely high density in view of the melt index, and Comparative Examples 2 to 5 also showed inferior density and molecular weight when compared with the Examples.

If the density is greater than 0.870 g/cm$^3$, the optical properties of the copolymer thus prepared may be confirmed with the naked eye and may be compared with a copolymer having a density of about 0.860 g/cm$^3$. Particularly, it could be inferred from the observation of opaque white color in the copolymers of Comparative Examples 4 and 5.

Through this, it could be found that in case of applying a transition metal where a bond angle is controlled when a ligand compound and a transition metal make coordination bond as the transition metal compound according to an embodiment of the present invention, an olefin polymer having a ultra low density and high molecular weight may be prepared. It could be confirmed that the polymer thus prepared may be very usefully applied to a ultra low density polyethylene having excellent rigidity, excellent optical properties and excellent impact absorbing capacity.

TABLE 1

| | Transition metal compound | Density | MI2.16 | MFRR | Tc | Tm |
|---|---|---|---|---|---|---|
| Example 1 | Formula 1-1 | 0.863 | 0.92 | 8.13 | 7.1/41.9/68.6 | 60.4 |
| Example 2 | Formula 1-2 | 0.865 | 1.0 | 7.36 | 24.7/72.7 | 45.7/97.3 |
| Comparative Example 1 | Compound A | 0.900 | 31.54 | 8.60 | 44.2/82.7 | 97.9 |
| Comparative Example 2 | Compound B | 0.879 | 8.0 | 8.28 | 56.6 | 72.7 |
| Comparative Example 3 | Compound C | 0.885 | 2.0 | 8.32 | 70.8 | 80.5 |
| Comparative Example 4 | Compound D | 0.875 | 2.5 | 8.48 | 34.4/71.3 | 53.8/90.3 |
| Comparative Example 5 | Compound E | 0.871 | 1.1 | 8.30 | 39.3/71.4 | 59.0/(112.8) |

The invention claimed is:

1. A transition metal compound represented by Formula 1:

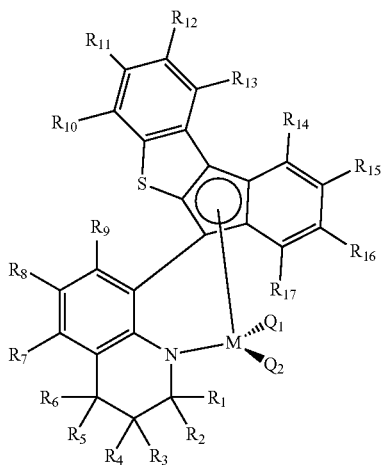

[Formula 1]

in Formula 1,

R$_1$ to R$_6$ are each independently hydrogen, —NR$_a$R$_b$, a substituted or unsubstituted alkyl group of 1 to 20 carbon atoms, a substituted or unsubstituted cycloalkyl group of 3 to 20 carbon atoms, a substituted or unsubstituted alkenyl group of 2 to 20 carbon atoms, a substituted or unsubstituted alkoxy group of 1 to 20 carbon atoms, or a substituted or unsubstituted aryl group of 6 to 20 carbon atoms, R$_7$ to R$_{17}$ are each independently hydrogen, —NR$_a$R$_b$, a substituted or unsubstituted alkyl group of 1 to 20 carbon atoms, a substituted or unsubstituted cycloalkyl group of 3 to 20 carbon atoms, a substituted or unsubstituted alkenyl group of 2 to 20 carbon atoms, a substituted or unsubstituted alkoxy group of 1 to 20 carbon atoms, or a substituted or unsubstituted aryl group of 6 to 20 carbon atoms, M is a transition metal in group 4, Q$_1$ and Q$_2$ are each independently hydrogen, halogen, —NR$_a$R$_b$, a substituted or unsubstituted alkyl group of 1 to 20 carbon atoms, a substituted or unsubstituted cycloalkyl group of 3 to 20 carbon atoms, a substituted or unsubstituted alkenyl group of 2 to 20 carbon atoms, or a substituted or unsubstituted aryl group of 6 to 20 carbon atoms, a substituent of the substituted groups of R$_1$ to R$_{17}$, Q$_1$ and Q$_2$ is selected from the group consisting of —NR$_a$R$_b$, an alkyl group of 1 to 10 carbon atoms, a cycloalkyl group of 3 to 20 carbon atoms, an aryl group of 6 to 20 carbon atoms, and an alkoxy group of 1 to 10 carbon atoms, and R$_a$ and R$_b$ are each independently hydrogen, an alkyl group of 1 to 10 carbon atoms, a cycloalkyl group of 3 to 10 carbon atoms, or an aryl group of 6 to 20 carbon atoms.

2. The transition metal compound according to claim 1, wherein in Formula 1,

R$_1$ to R$_{17}$ are each independently hydrogen, a substituted or unsubstituted alkyl group of 1 to 20 carbon atoms, a substituted or unsubstituted cycloalkyl group of 3 to 20 carbon atoms, or a substituted or unsubstituted aryl group of 6 to 20 carbon atoms, M is Ti, Hf or Zr, and Q$_1$ and Q$_2$ are each independently hydrogen, halogen, a substituted or unsubstituted alkyl group of 1 to 20 carbon atoms, a substituted or unsubstituted cycloalkyl group of 3 to 20 carbon atoms, or an unsubstituted aryl group of 6 to 20 carbon atoms.

3. The transition metal compound according to claim 1, wherein in Formula 1,

R$_1$ to R$_{17}$ are each independently hydrogen, an unsubstituted alkyl group of 1 to 10 carbon atoms, an unsubstituted cycloalkyl group of 3 to 10 carbon atoms, or an unsubstituted aryl group of 6 to 20 carbon atoms, and Q$_1$ and Q$_2$ are each independently hydrogen, halogen, an unsubstituted alkyl group of 1 to 10 carbon atoms, an unsubstituted cycloalkyl group of 3 to 10 carbon atoms, or an unsubstituted aryl group of 6 to 20 carbon atoms.

4. The transition metal compound according to claim 1, wherein in Formula 1, R$_1$ to R$_6$ are each independently hydrogen, or a substituted or unsubstituted alkyl group of 1 to 10 carbon atoms, where one or more among R$_1$ to R$_6$ are substituted or unsubstituted alkyl groups of 1 to 10 carbon atoms.

5. The transition metal compound according to claim 1, wherein in Formula 1, R$_1$ is hydrogen, or a substituted or unsubstituted alkyl group of 1 to 10 carbon atoms, and R$_2$ to R$_6$ are hydrogen.

6. The transition metal compound according to claim 1, wherein in Formula 1, R$_7$ to R$_{17}$ are each independently hydrogen, or a substituted or unsubstituted alkyl group of 1 to 10 carbon atoms.

7. The transition metal compound according to claim 1, wherein in Formula 1, M is Ti.

8. The transition metal compound according to claim 1, wherein in Formula 1, Q$_1$ and Q$_2$ are each independently hydrogen, halogen, or a substituted or unsubstituted alkyl group of 1 to 10 carbon atoms.

9. The transition metal compound according to claim 1, wherein the transition metal compound is selected from a compound of Formula 1-1 or a compound of Formula 1-2:

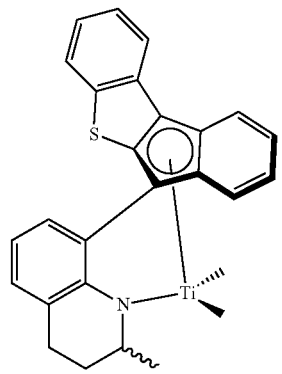

[Formula 1-1]

[Formula 1-2]

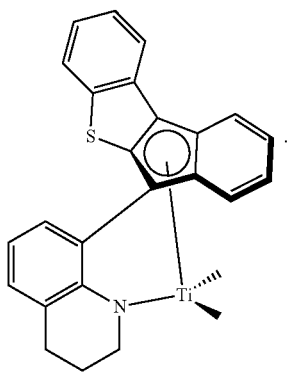

10. A catalyst composition comprising the transition metal compound according to claim 1.

11. The catalyst composition according to claim 10, further comprising one or more cocatalysts.

12. The catalyst composition according to claim 11, wherein the one or more cocatalyst comprises at least one compound selected from Formulae 7, 8 or 9:

$$—[Al(R_{22})—O]_a—$$  [Formula 7]

where each $R_{22}$ is independently a halogen radical, a hydrocarbyl radical of 1 to 20 carbon atoms, or a halogen-substituted hydrocarbyl radical of 1 to 20 carbon atoms, and a is an integer of 2 or more;

$$D(R_{22})_3$$  [Formula 8]

where D is aluminum or boron, and each $R_{22}$ is independently the same as defined in Formula 7;

$$[L-H]^+[Z(A)_4]^- \text{ or } [L]^+[Z(A)_4]^-$$  [Formula 9]

where L is a neutral Lewis base, $[L]^+$ is a cationic Lewis acid, H is a hydrogen atom, Z is an element in group 13, and each A is independently aryl of 6 to 20 carbon atoms or alkyl of 1 to 20 carbon atoms, where one or more hydrogen atoms are optionally substituted with a substituents selected from halogen, hydrocarbyl of 1 to 20 carbon atoms, alkoxy of 1 to 20 carbon atoms, or aryloxy of 6 to 20 carbon atoms.

13. A method for preparing an olefin polymer, the method comprising:
polymerizing an olefin monomer or a monomer mixture comprising an olefin monomer and an alpha olefin comonomer in the presence of the catalyst composition according to claim 10 to form an olefin polymer,
wherein the olefin monomer comprises at least one of ethylene or propylene.

14. The method for preparing an olefin polymer according to claim 13, wherein the olefin polymer is a homopolymer or a copolymer.

\* \* \* \* \*